United States Patent
Wang

(10) Patent No.: US 10,222,611 B2
(45) Date of Patent: Mar. 5, 2019

(54) LIGHT INTEGRATION MODULE AND OPTICAL SYSTEM EMPLOYING SAME

(71) Applicant: DELTA ELECTRONICS, INC., Taoyuan Hsien (TW)

(72) Inventor: Bor Wang, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 538 days.

(21) Appl. No.: 14/562,200

(22) Filed: Dec. 5, 2014

(65) Prior Publication Data

US 2015/0198804 A1     Jul. 16, 2015

Related U.S. Application Data

(60) Provisional application No. 61/928,087, filed on Jan. 16, 2014.

(30) Foreign Application Priority Data

Aug. 22, 2014  (TW) .............................. 103129101 A

(51) Int. Cl.
| | |
|---|---|
| *F21V 8/00* | (2006.01) |
| *G02B 27/00* | (2006.01) |
| *G02B 1/11* | (2015.01) |
| *G02B 6/42* | (2006.01) |

(52) U.S. Cl.
CPC ............ *G02B 27/0006* (2013.01); *G02B 1/11* (2013.01); *G02B 6/4207* (2013.01); *G02B 6/0006* (2013.01)

(58) Field of Classification Search
CPC .............. G02B 27/0994; G02B 6/0008; G02B 27/0927; G02B 6/0006

USPC .................................................. 362/551–582
See application file for complete search history.

(56) References Cited

U.S. PATENT DOCUMENTS

| | | | |
|---|---|---|---|
| 6,272,269 B1 | 8/2001 | Naum | |
| 6,341,876 B1* | 1/2002 | Moss | G02B 6/0006 362/551 |
| 6,953,275 B2 | 10/2005 | Ferri et al. | |
| 7,976,204 B2* | 7/2011 | Li | G02B 6/0008 362/555 |
| 2002/0039293 A1 | 4/2002 | Li | |
| 2004/0080833 A1 | 4/2004 | Fujisawa et al. | |

(Continued)

FOREIGN PATENT DOCUMENTS

| | | |
|---|---|---|
| CN | 1330279 | 1/2002 |
| CN | 1471647 | 1/2004 |

(Continued)

*Primary Examiner* — William J Carter
(74) *Attorney, Agent, or Firm* — Kirton McConkie; Evan R. Witt

(57) ABSTRACT

An optical system comprises a light source and a light integration module, which comprises a light integration rod, an optical assembly and an anti-reflection coating. The light integration rod has an entrance, which is covered by the optical assembly. The optical assembly has a transparent surface, and a surface area of the transparent surface is greater than a cross-sectional area of the entrance of the light integration rod. The anti-reflection coating is formed on the transparent surface. After an incident light is transmitted through the anti-reflection coating, it is transmitted through the optical assembly along a light path, and then outputted to the entrance of the light integration rod.

8 Claims, 6 Drawing Sheets

(56) References Cited

U.S. PATENT DOCUMENTS

2005/0083685 A1 4/2005 Yeh et al.
2008/0278691 A1 11/2008 Willemsen et al.
2013/0058124 A1* 3/2013 Park .................. G02B 6/262
362/553

FOREIGN PATENT DOCUMENTS

TW 200502602 1/2005
TW 200513715 4/2005

* cited by examiner

LIGHT INTEGRATION MODULE AND OPTICAL SYSTEM EMPLOYING SAME

CROSS-REFERENCE TO RELATED APPLICATION

This application claims the benefit of U.S. Provisional Application No. 61/928,087 filed on Jan. 16, 2014, and entitled "LIGHT INTEGRATION MODULE AND OPTICAL PROJECTION SYSTEM EMPLOYING SAME", the entirety of which is hereby incorporated by reference.

FIELD OF THE INVENTION

The present invention relates to a light integration module, and more particularly to a light integration module capable of avoiding dust being stuck to the entrance of the light integration rod of the light integration module and the optical system employing same.

BACKGROUND OF THE INVENTION

In recent years, a variety of projectors have been widely used in various video applications. For example, the projectors can be used for making presentations, holding meetings or giving lectures in classrooms, board rooms, conference rooms or home theaters. By a projector, an image signal from an image signal source can be enlarged and shown on a projection screen.

FIG. 1 shows the light path from the lamp to the projection lens in a digital light processing (DLP) projection system according to a prior art. As shown in FIG. 1, the projection system 1 includes a lamp 11, a light integration rod 12 (i.e. light tunnel), a set of relay optics 13, a total internal reflection prism 14 (TIR prism), a digital micromirror device 15 (DMD) and a projection lens 16. The lamp 11 with an elliptical reflector can output light beam 11a and converge the light beam 11a into the light integration rod 12. The uniformed light outputted from the light integration rod 12 is relayed through the set of relay optics 13 and the TIR prism 14 and then outputted to the DMD 15. Then, the uniformed light is modulated by the DMD 15 and been projected onto screen (not shown in FIG. 1) via the projection lens 16.

FIG. 2 shows the convergent light transmitted to the entrance of the light integration rod of FIG. 1. When using the light integration rod 12, the entrance and exiting surfaces are usually coated with anti-reflection (AR) layers to increase transmittance. Because the convergent light beam 11a from the lamp 11 is focused onto the entrance surface 121 of the light integration rod 12, the surface temperature on the entrance surface 121 of the light integration rod 12 is relatively high. So, it is important for the AR coating formed on the entrance surface 121 of the light integration rod 12 to resist high temperature.

As the power of the lamp 11 is increased, the temperature on the entrance surface 121 of the light integration rod 12 is also increased a lot. It is possible for dust to stick on the surface of the integration rod 12 as the projection system 1 ages. The surface temperature where the dust sticks will be increased due to the heat absorption of the dust, such that the AR coating could be damaged. In this situation, the AR coating is usually removed to solve this problem. However, this will degrade luminous flux due to lower light transmittance of the light integration rod 12. In general, the refraction index of a glass is around 1.5. Base on Fresnel Equation, the reflectivity of a glass without AR coating is around 4%.

Also, a suitable AR coating in general can reduce the reflectivity of the glass to be lower than 1%. This means the optical system will lose around 3% of light if the AR coating of the light integration rod 12 is removed.

Therefore, there is a need of providing a light integration module and an optical system to obviate the drawbacks encountered from the prior arts.

SUMMARY OF THE INVENTION

The present invention provides a light integration module and an optical system. By mounting an optical assembly with greater surface area in front of the light integration rod, the drawbacks encountered by the prior arts can be overcome.

The present invention also provides a light integration module and an optical system. By mounting an optical assembly with greater surface area in front of the light integration rod, the light incident area on the anti-reflection coating is increased. Due to the increasing of light incident area, the light density of the anti-reflection coating and the working temperature of the anti-reflection coating are decreased. As a result, the anti-reflection coating is retained, and the damage of the anti-reflection coating can be prevented. Consequently, the benefit of enhancing the light transmittance of the light integration module is achieved.

In accordance with an aspect of the present invention, there is provided a light integration module. The light integration module comprises a light integration rod, an optical assembly and an anti-reflection coating. The light integration rod has an entrance which is covered by the optical assembly. The optical assembly includes a transparent surface, and a surface area of the transparent surface is greater than a cross-sectional area of the entrance of the light integration rod. The anti-reflection coating is formed on the transparent surface. After an incident light is transmitted through the anti-reflection coating, it is transmitted through the optical assembly along a light path, and then outputted to the entrance of the light integration rod.

In accordance with another aspect of the present invention, there is provided an optical system. The optical system comprises a light integration module and a light source. The light integration module comprises a light integration rod, an optical assembly and an anti-reflection coating. The light integration rod has an entrance which is covered by the optical assembly. The optical assembly includes a transparent surface, and a surface area of the transparent surface is greater than a cross-sectional area of the entrance of the light integration rod. The anti-reflection coating is formed on the transparent surface. An incident light is provided by the light source. After the incident light is transmitted through the anti-reflection coating, it is transmitted through the optical assembly along a light path, and then outputted to the entrance of the light integration rod.

In accordance with another aspect of the present invention, there is provided a light integration module. The light integration module comprises a light integration rod, an optical assembly and an anti-reflection coating. The light integration rod has an entrance which is optically coupled with the optical assembly. The optical assembly includes a transparent surface, and a surface area of the transparent surface is greater than a cross-sectional area of the entrance of the light integration rod. The anti-reflection coating is formed on the transparent surface. The optical assembly is disposed at an upstream of a light path, the light integration rod is disposed at a downstream of the light path, and an incident light is transmitted through the anti-reflection coating and along the light path.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
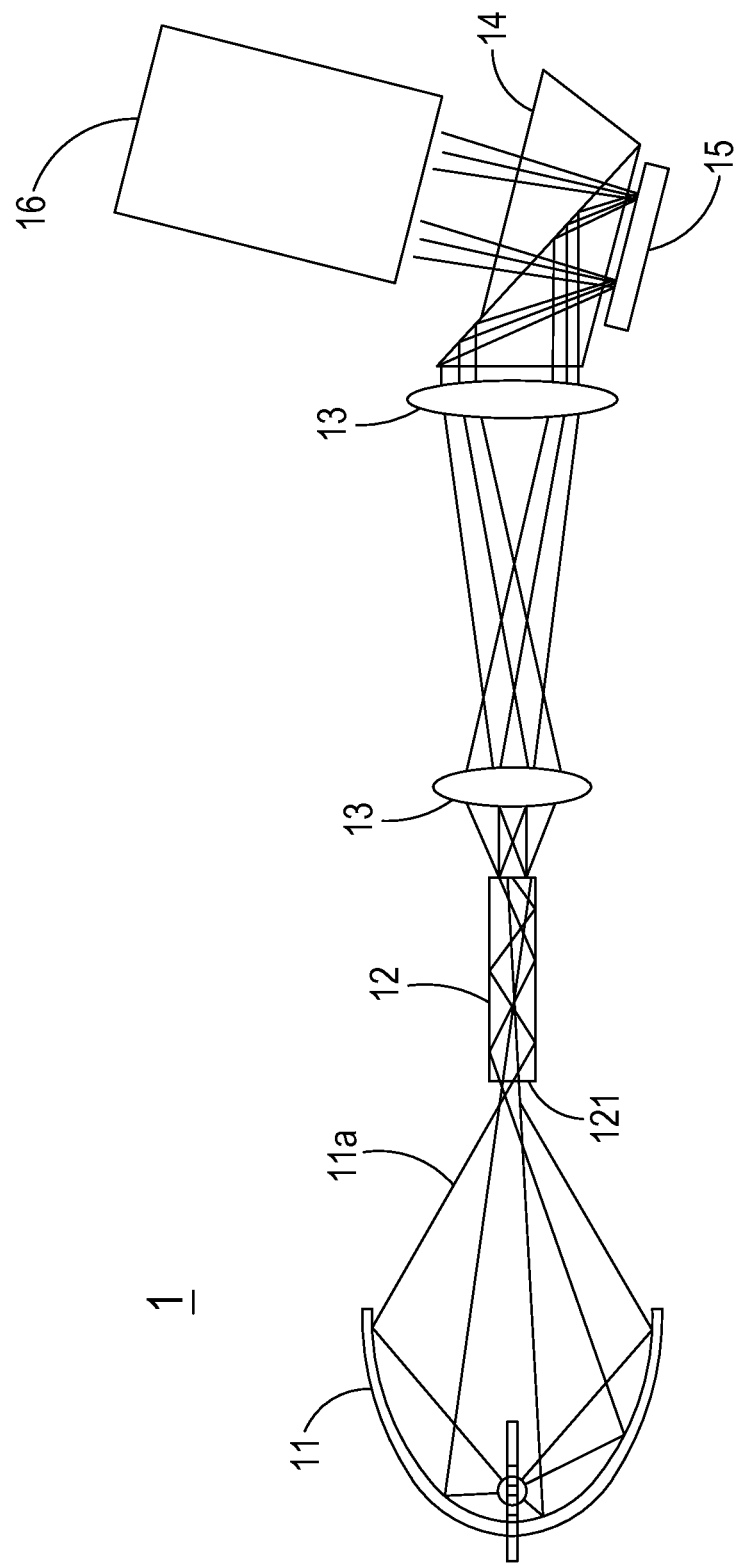
FIG. 1 shows the light path from the lamp to the projection lens in a DLP projection system according to a prior art.
Figure 2:
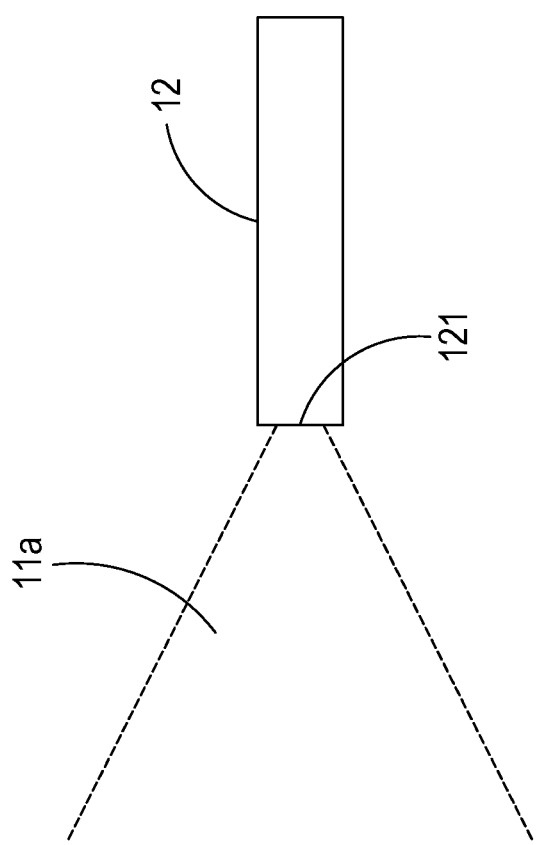
FIG. 2 shows the convergent light transmitted to the entrance of the light integration rod of FIG. 1.
Figure 3:
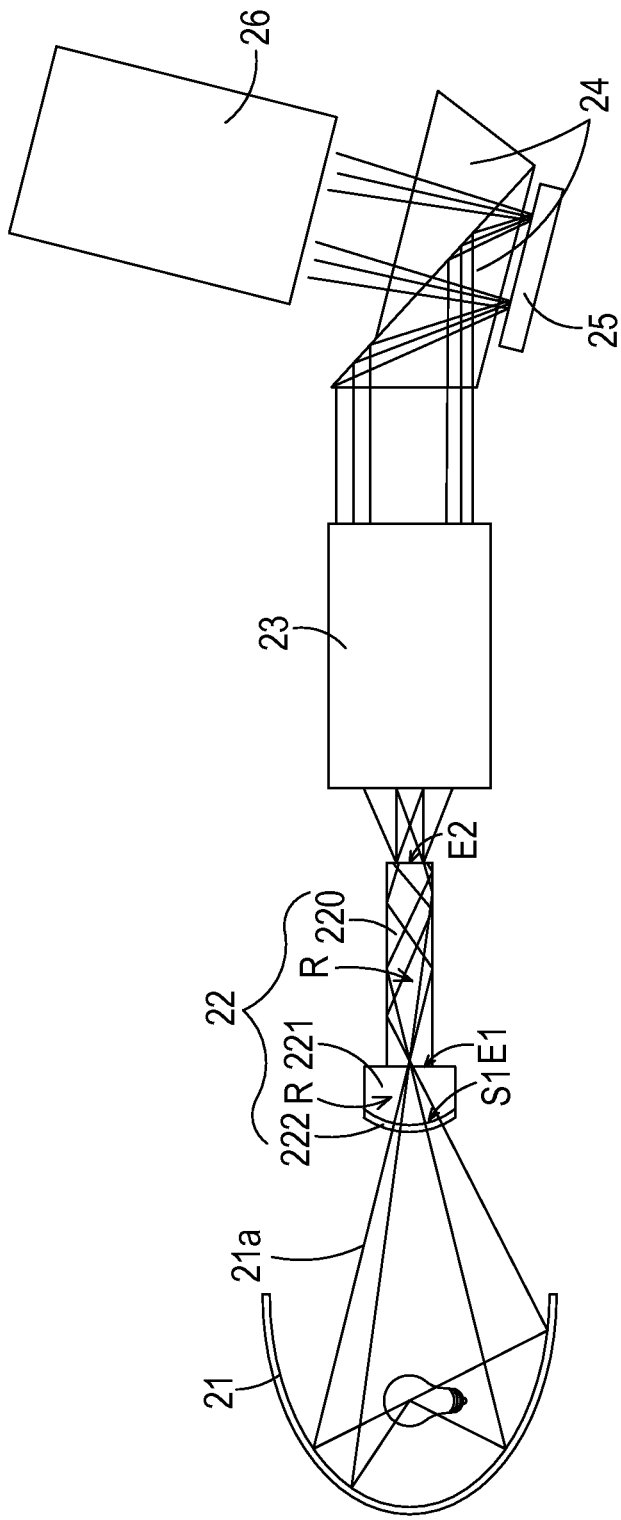
FIG. 3 is a schematic view illustrating the light path from the light source to the projection lens in an optical system of the present invention.
Figure 4A:
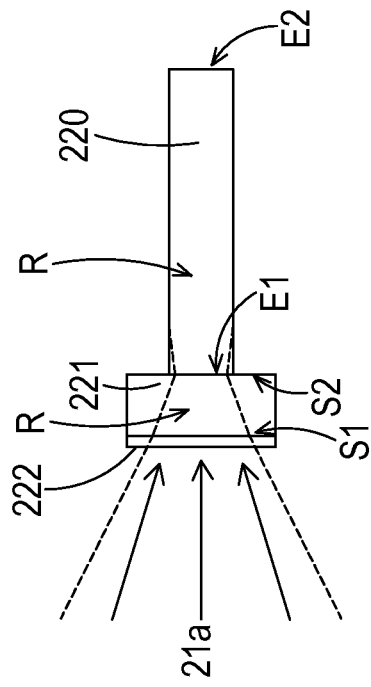
FIG. 4A is a schematic view illustrating the light integration module with a plano-convex lens of the present invention.
Figure 4B:
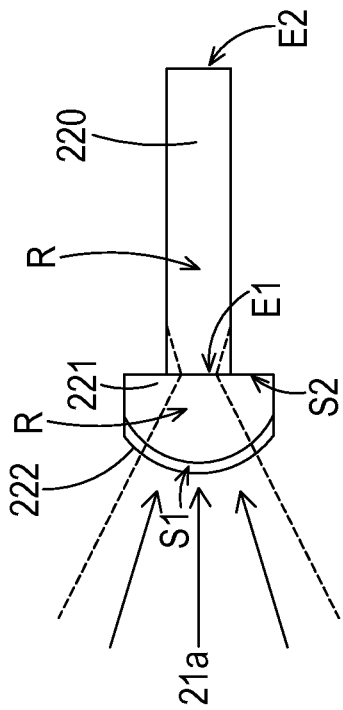
FIG. 4B is a schematic view illustrating the light integration module with a plano-plano glass plate of the present invention.
Figure 4C:
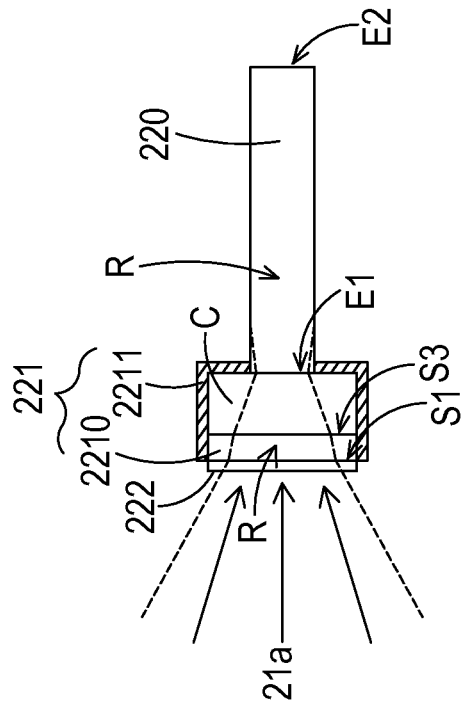
FIG. 4C is another schematic view illustrating the light integration module with a plano-convex lens of the present invention.
Figure 4D:
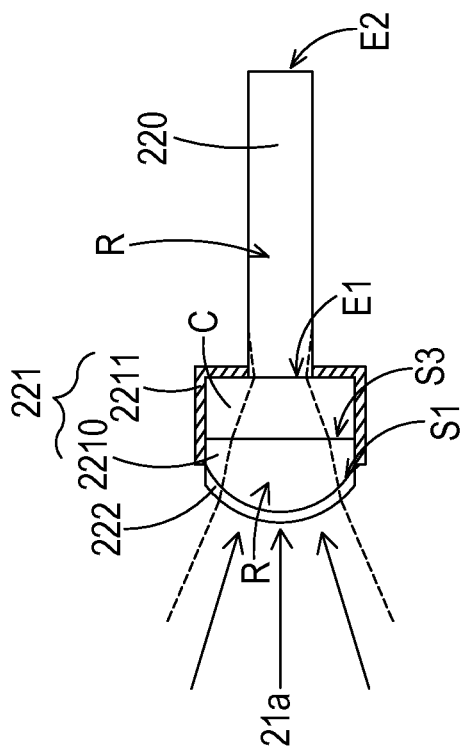
FIG. 4D is another schematic view illustrating the light integration module with a plano-plano glass plate of the present invention.
Figure 4E:
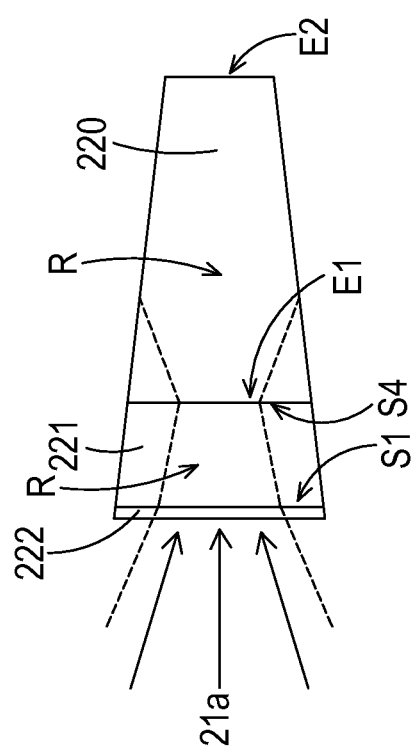
FIG. 4E is another schematic view illustrating the light integration module of the present invention.

Please refer to FIG. 3, FIG. 4A, FIG. 4B, FIG. 4C, FIG. 4D and FIG. 4E. FIG. 3 is a schematic view illustrating the light path from the light source to the projection lens in an optical system of the present invention; FIG. 4A is a schematic view illustrating the light integration module with a plano-convex lens of the present invention; FIG. 4B is a schematic view illustrating the light integration module with a plano-plano glass plate of the present invention; FIG. 4C is another schematic view illustrating the light integration module with a plano-convex lens of the present invention; FIG. 4D is another schematic view illustrating the light integration module with a plano-plano glass plate of the present invention; and FIG. 4E is another schematic view illustrating the light integration module of the present invention. As shown in FIGS. 3 and 4A, the optical system 2 (also referred to as a projection system) comprises a light source 21, a light integration module 22, a set of relay lens 23, a TIR prism 24, an image displaying device 25 and a projection lens 26. The light source 21 outputs a converged light beam 21a to the light integration module 22. The light source 21 can be but not limited to a lamp, a light emitting diode (LED) module or a laser module, so that the light beam 21a is converged on light integration module 22. The image displaying device 25 can be a digital micromirror device (DND). Next, the uniformed light beam 21a outputted from the light integration module 22 is relayed through the set of relay lens 23 and TIR prism 24, sequentially, and then incident onto the image displaying device 25. Then, the uniformed light beam 21a is modulated by the image displaying device 25 and been projected onto screen (not shown in FIG. 3) via the projection lens 26. Among the light beam 21a shown in FIGS. 3, 4A, 4B, 4C, 4D and 4E, it is briefly drawn for representation of the practical light but the practical light beam outputted from the light source 21 is integrated and continued. Similarly, the light path R illustrates the transmitting path of a light entered into the light integration module 22.

Please refer to FIG. 3 again. The light integration module 22 comprises a light integration rod 220, an optical assembly 221 and an anti-reflection coating 222. The light integration rod 220 can be a transparent solid column. Preferably, the light integration rod 220 is made of glass. In addition, the light integration rod 220 has an entrance E1 and an exit E2. After a light is incident on the entrance E1 of the light integration rod 220, the light leaves the integration rod 220 through the exit E2. Furthermore, the entrance E1 of the light integration rod 220 is covered by the optical assembly 221, the optical assembly 221 includes a transparent surface S1, and the anti-reflection coating 222 is formed on the transparent surface S1. Therefore, the light beam 21a outputted from the light source 21 is transmitted through the anti-reflection coating 222 and then incident on the transparent surface S1 of the optical assembly 221. Then, the light beam 21a is transmitted through the optical assembly 221 along a light path R and then incident on the entrance E1 of the light integration rod 220, so that the light beam 21a enters the light integration rod 220. Under this circumstance, the light beam 21a is uniformed by the total internal reflection of the light integration rod 220, and outputted through the exit E2.

In addition, as shown in FIGS. 4A, 4B, 4C, 4D and 4E, the entrance E1 of the light integration rod 220 has a cross-sectional area, and the transparent surface S1 of the optical assembly 221 has a surface area which is greater than the cross-sectional area of the entrance E1 of the light integration rod 220. Namely, the optical assembly 221 is additionally installed in front of the light integration rod 220, the anti-reflection coating 222 is formed on the transparent surface S1 of the optical assembly 221, and the optical assembly 221 is optically coupled with the entrance E1 of the light integration rod 220. Under this circumstance, the light incident area formed by the light beams 21 on the anti-reflection coating 222 is increased, the light density of the light beam 21a transmitted through the anti-reflection coating 222 is reduced, and the overheating of the anti-reflection coating 222 can be prevented. In addition, the power of the the light source 21 can be increased, and the anti-reflection coating 222 is retained at the same time so as to improve the transmittance of the light integration module 22, integrally. Furthermore, as the optical system 2 ages, more dust is likely to be stuck and accumulated on the anti-reflection coating 222. Although the dust absorbs the energy released from the light source 21 and converts the energy into heat when light is incident on the anti-reflection coating 222, the overheating of the anti-reflection coating 222 can be prevented by increasing the light incident area on the anti-reflection coating 222. Namely, the dust stuck on the surface of the anti-reflection coating 222 is properly distributed on the increased incident area of the anti-reflection coating 222, so that the overheating and damage of the anti-reflection coating 222 can be prevented. Consequently, the integral transmittance of the light integration module 22 is maintained even though the optical system 2 is aged.

In some embodiments, the optical assembly 221 can be a plano-convex lens (shown in FIG. 4A), a plano-plano glass plate (shown in FIG. 4B). In other embodiments, the optical assembly 221 is a composite component including a transparent member 2210 and a fixing member 2211. In another embodiment, the optical assembly 221 is an extension part of the light integration rod 220 (shown in FIG. 4E). Namely, the optical assembly 221 is a surface expansion assembly with a specified thickness and allowing light passing therethrough. The surface expansion assembly includes a transparent surface S1. That is to say, the surface expansion assembly is disposed at an upstream of the light path R, and the light integration rod 220 is disposed at a downstream of the light path R. The surface area of the transparent surface S1 of the surface expansion assembly is greater than the cross-sectional area of the entrance E1 of the light integration rod 220. The light incident area on the anti-reflection coating 222 is increased because the surface expansion assembly is disposed at the upstream of the light path R. Therefore, the light density and the working temperature of the anti-reflection coating are lowered.

Please refer to FIGS. 4A and 4B, the optical assembly 221 has a transparent surface S1 and a rear surface S2 opposite to the transparent surface S1. After an incident light is incident on the transparent surface S1, the incident light is transmitted through the transparent surface S1 and the rear surface S2 and enters into the entrance E1 of the light integration rod 220 along the light path R, serially. In one embodiment as shown in of FIG. 4A, the optical assembly 221 is a plano-convex lens. The transparent surface S1 can be various smooth convex surfaces. Preferably, the transparent surface S1 is a spherical surface, and the rear surface S2 is a flat surface. In one alternative embodiment as shown in FIG. 4B, the optical assembly 221 is a plano-plano glass plate. Preferably, the transparent surface S1 and the rear surface S2 are both flat surfaces. In some embodiments, the rear surface S2 of the optical assembly 221 is in contact with the entrance E1 of the light integration rod 220. Preferably, the optical assembly 221 is attached on and in front of the light integration rod 220 by using, for example but not limited to, an adhesive. In some embodiments, the light integration rod 220 and the optical assembly 221 are integrally formed. In other words, the entrance E1 of the light integration rod 220 is correspondingly connected with the rear surface S2 of the optical assembly 221, and the light integration rod 220 and the optical assembly 221 are made in one piece. In some embodiments, the rear surface S2 of the optical assembly 221 has a surface area which is greater than the cross-sectional area of the entrance E1 of the light integration rod 220.

Please refer to FIGS. 4C and 4D, in some embodiments, the optical assembly 221 includes a transparent member 2210 and a fixing member 2211. The transparent member 2210 has a transparent surface S1 and an internal surface S3 opposite to the transparent surface S1. The transparent member 2210 is fixed to the fixing member 2211, and the fixing member 2211 is fixed to the light integration rod 220. A space C is surrounded and formed by the internal surface S3 of the transparent member 2210, the fixing member 2211 and the light integration rod 220, so that the internal surface S3 of the transparent member 2210 is spaced from the light integration rod 220 through the space C. Under this circumstance, the light incident on the transparent surface S1 is transmitted through the transparent surface S1, the internal surface S3 and the space C along a light path R, serially, and then enters the entrance E1 of the light integration rod 220. Therefore, the strength of linkage between the optical assembly 221 and the light integration rod 220 is enhanced, and the cost of the transparent material can be reduced.

In one embodiment as shown in FIG. 4C, the transparent member 2210 of the optical assembly 221 is a plano-convex lens. The transparent surface S1 can be various smooth convex surfaces. Preferably, the transparent surface S1 is a spherical surface, and the internal surface S3 is a flat surface. In one alternative embodiment as shown in FIG. 4D, the transparent member 2210 of the optical assembly 221 is a plano-plano lens. Preferably, the transparent surface S1 and the internal surface S3 are both flat surface. In some embodiments, the material of the fixing member 2211 is selected from plastic or iron alloys, but it is not limited thereto.

Please refer to FIG. 4E again, the optical assembly 221 includes a joint surface S4. The joint surface S4 is opposed to the transparent surface S1. The joint surface S4 is coupled with the entrance E1 of the light integration rod 220. The cross-sectional area of the joint surface S4 of the optical assembly 221 is equal to the cross-sectional area of the entrance E1 of the light integration rod 220, so that the optical assembly 221 is formed into a tapered structure. In some embodiments, the cross-sectional surface of the entrance E1 of the light integration rod 220 is greater than the cross-sectional area of the exit E2 of the light integration rod 220, and a peripheral surface of the optical assembly 221 is level to a peripheral surface of the light integration rod 220, so that the optical assembly 221 and the light integration rod 220 are jointly formed into a tapered structure. Therefore, the manufacturing cost is reduced. In some embodiments, the joint surface S4 of the optical assembly 221 is in contact with the entrance E1 of the light integration rod 220. Preferably, the optical assembly 221 is attached on and in front of the light integration rod 220 by using, for example but not limited to, an adhesive. In some embodiments, the light integration rod 220 and the optical assembly 221 are integrally formed. In other words, the entrance E1 of the light integration rod 220 is correspondingly coupled with the joint surface S4 of the optical assembly 221, and the light integration rod 220 and the optical assembly 221 are made in one piece.

From the above descriptions, the present invention provides a light integration module and an optical system. By mounting an optical assembly with greater surface area in front of the light integration rod, the light incident area on the anti-reflection coating is increased. Due to the increasing of light incident area, the light density of the anti-reflection coating and the working temperature of the anti-reflection coating are decreased. Consequently, the power of the light source can be enhanced, and the anti-reflection coating is retained at the same time so that the benefit of enhancing the transmittance of the light integration module can be achieved. Furthermore, the dust stuck on the surface of the anti-reflection coating is properly distributed on the increased incident area of the anti-reflection coating, so that the overheating and damage of the anti-reflection coating can be prevented. Consequently, the transmittance of the light integration module is maintained even though the optical system is aged.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A light integration module comprising:
a light integration rod having an entrance and an exit, wherein a cross-sectional area of the entrance is greater than a cross-sectional area of the exit;
an optical assembly including a transparent surface, wherein the entrance of the light integration rod is covered by the optical assembly, and a surface area of the transparent surface is greater than the cross-sectional area of the entrance of the light integration rod; and
an anti-reflection coating formed on the transparent surface,
wherein after being transmitted through the anti-reflection coating, an incident light is firstly refracted at the transparent surface of the optical assembly, transmitted through the optical assembly, then refracted at the interface of the optical assembly and the light integration rod, and then outputted to the light integration rod along a light path,
wherein the optical assembly is a plano-plano glass plate, wherein the optical assembly has a peripheral surface level to a peripheral surface of the light integration rod, so that the entirety of the optical assembly and the light integration rod is formed into a continuously tapered structure decreasing from the side of the anti-reflection coating to the side of the exit, and
wherein the optical assembly is attached on and in front of the light integration rod by using an adhesive, and the optical assembly and the light integration rod have different refractive indexes.

2. The light integration module according to claim 1, wherein the optical assembly further comprises a rear surface opposite to the transparent surface, the rear surface is in contact with the entrance of the light integration rod so that the incident light incident on the anti-reflection coating is serially transmitted through the transparent surface and the rear surface of the optical assembly along the light path and then incident on the entrance of the light integration rod.

3. The light integration module according to claim 1, wherein the optical assembly further comprises a joint surface opposing to the transparent surface, the joint surface is coupled with the entrance of the light integration rod, and a cross-sectional area of the joint surface is equal to the cross-sectional surface of the entrance of the light integration rod, so that the optical assembly is formed into a tapered structure.

4. The light integration module according to claim 1, wherein the light integration rod and the optical assembly is formed in one piece.

5. An optical system comprising:
a light integration module, comprising:
a light integration rod having an entrance and an exit, wherein a cross-sectional area of the entrance is greater than a cross-sectional area of the exit;
an optical assembly including a transparent surface, wherein the entrance of the light integration rod is covered by the optical assembly, and a surface area of the transparent surface is greater than the cross-sectional area of the entrance of the light integration rod; and
an anti-reflection coating formed on the transparent surface; and
a light source providing an incident light incident on the anti-reflection coating,
wherein after being transmitted through the anti-reflection coating, the incident light is firstly refracted at the transparent surface of the optical assembly, transmitted through the optical assembly, then refracted at the interface of the optical assembly and the light integration rod, and then outputted to the light integration rod along a light path,
wherein the optical assembly is a plano-plano glass plate, wherein the optical assembly has a peripheral surface level to a peripheral surface of the light integration rod, so that the entirety of the optical assembly and the light integration rod is formed into a continuously tapered structure decreasing from the side of the anti-reflection coating to the side of the exit, and
wherein the optical assembly is attached on and in front of the light integration rod by using an adhesive, and the optical assembly and the light integration rod have different refractive indexes.

6. A light integration module comprising:
a light integration rod having an entrance and an exit, wherein the cross-sectional area of the entrance is greater than a cross-sectional area of the exit;
an optical assembly optically coupled with the entrance of the light integration rod and including a transparent surface, wherein a surface area of the transparent surface is greater than the cross-sectional area of the entrance of the light integration rod; and
an anti-reflection coating formed on the transparent surface,
wherein the optical assembly is disposed at an upstream of a light path, the light integration rod is disposed at a downstream of the light path, and wherein after being transmitted through the anti-reflection coating, an incident light is firstly refracted at the transparent surface of the optical assembly, then refracted at the interface of the optical assembly and the light integration rod, and then transmitted along the light path,
wherein the optical assembly is a plano-plano glass plate, wherein the optical assembly has a peripheral surface level to a peripheral surface of the light integration rod, so that the entirety of the optical assembly and the light integration rod is formed into a continuously tapered structure decreasing from the side of the anti-reflection coating to the side of the exit, and
wherein the optical assembly is attached and in front of the light integration rod by using an adhesive, and the optical assembly and the light integration rod have different refractive indexes.

7. The light integration module according to claim 6, wherein the optical assembly further comprises a rear surface opposite to the transparent surface, the rear surface is in contact with the entrance of the light integration rod so that the incident light incident on the anti-reflection coating is serially transmitted through the transparent surface and the rear surface of the optical assembly along the light path and then incident on the entrance of the light integration rod.

8. The light integration module according to claim 6, wherein the optical assembly further comprises a joint surface opposing to the transparent surface, the joint surface is coupled with the entrance of the light integration rod, and a cross-sectional area of the joint surface is equal to the cross-sectional surface of the entrance of the light integration rod, so that the optical assembly is formed into a tapered structure.

* * * * *